US 12,116,973 B1

(12) United States Patent
Deiana (10) Patent No.: US 12,116,973 B1
(45) Date of Patent: Oct. 15, 2024

(54) OCEAN MULTITASKING GENERATOR

(71) Applicant: Salvatore Deiana, Vancouver (CA)

(72) Inventor: Salvatore Deiana, Vancouver (CA)

( * ) Notice: Subject to any disclaimer, the term of this patent is extended or adjusted under 35 U.S.C. 154(b) by 0 days.

(21) Appl. No.: 18/765,913

(22) Filed: Jul. 8, 2024

(51) Int. Cl.
*F03B 13/26* (2006.01)
*F03B 11/00* (2006.01)

(52) U.S. Cl.
CPC .......... *F03B 13/266* (2013.01); *F03B 11/002* (2013.01); *F05B 2240/95* (2013.01); *F05B 2250/231* (2013.01); *F05B 2250/24* (2013.01); *F05B 2270/504* (2013.01)

(58) Field of Classification Search
CPC .. F03B 13/266; F03B 11/002; F05B 2240/95; F05B 2250/231
See application file for complete search history.

(56) References Cited

U.S. PATENT DOCUMENTS

| | | | | |
|---|---|---|---|---|
| 6,327,994 B1 * | 12/2001 | Labrador | ................ | B63B 39/06 114/382 |
| 7,821,147 B2 * | 10/2010 | Du Bois | ................ | F03D 13/20 290/55 |
| 8,030,793 B2 * | 10/2011 | Garvey | ................ | F03D 9/17 290/43 |
| 8,037,678 B2 * | 10/2011 | McBride | ................ | F15B 1/024 60/412 |
| 8,109,085 B2 * | 2/2012 | McBride | ................ | F15B 1/024 60/412 |
| 8,432,057 B2 * | 4/2013 | Filardo | ................ | F03B 17/06 290/54 |
| 8,468,815 B2 * | 6/2013 | McBride | ................ | F15B 1/024 91/506 |
| 8,624,416 B2 * | 1/2014 | Wille | ................ | F03D 9/255 290/53 |
| 8,803,346 B2 * | 8/2014 | Pitre | ................ | F03D 9/25 290/42 |
| 8,878,381 B2 * | 11/2014 | Henry | ................ | F03D 9/008 290/53 |
| 9,018,785 B2 * | 4/2015 | Chua | ................ | F03B 17/025 290/53 |
| 9,243,612 B2 * | 1/2016 | Carretero Bueno | .... | F03B 17/06 |
| 9,657,399 B2 * | 5/2017 | Leonard | ................ | C25B 1/04 |
| 10,280,894 B1 * | 5/2019 | Bender | ................ | F03B 13/20 |
| 10,352,290 B2 * | 7/2019 | Kang | ................ | F03B 13/1845 |
| 10,526,056 B1 * | 1/2020 | Hakki | ................ | F03D 1/025 |

(Continued)

FOREIGN PATENT DOCUMENTS

| | | | | |
|---|---|---|---|---|
| EP | | 3585957 B1 * | 10/2021 | ............. B63B 1/125 |
| WO | WO-2011069132 A1 * | | 6/2011 | ............. F03B 13/10 |

(Continued)

*Primary Examiner* — Pedro J Cuevas
(74) *Attorney, Agent, or Firm* — Donald R. Boys; Central Coast Patent Agengy LLC (57) ABSTRACT

An electricity generating apparatus has a turbine between two vertical water-tight towers on a floating base that may be managed to attain a buoyancy such that the towers protrude above a water surface and the turbine remains below the water surface. One tower has an upward extending air conduit with an air pump driven by wind vanes at an upper region. The turbine is adapted to be driven by both wave motion and by tide currents, and an air manifold beneath the turbine, fed with air from the air pump, feeds air to aid in turning the turbine, which in turn drives a generator in one of the towers.

10 Claims, 6 Drawing Sheets

(56) References Cited

U.S. PATENT DOCUMENTS

| | | | |
|---|---|---|---|
| 10,648,448 B2* | 5/2020 | Yoo | H02J 7/14 |
| 11,566,596 B2* | 1/2023 | Sheldon-Coulson | F03B 13/24 |
| 11,661,921 B2* | 5/2023 | Russell | F03B 13/00 |
| | | | 290/53 |
| 11,725,623 B2* | 8/2023 | Sheldon-Coulson | |
| | | | H02K 7/1823 |
| | | | 290/53 |
| 11,754,047 B2* | 9/2023 | Harris | F03B 13/1855 |
| | | | 416/53 |
| 11,788,504 B2* | 10/2023 | Sheldon-Coulson | |
| | | | F03B 13/142 |
| | | | 290/53 |
| 11,795,900 B2* | 10/2023 | Filardo | B63G 8/08 |
| 11,976,622 B2* | 5/2024 | Sheldon-Coulson | |
| | | | F03B 13/142 |
| 12,012,185 B2* | 6/2024 | Kim | B63B 39/03 |
| 12,037,972 B2* | 7/2024 | Sheldon-Coulson | |
| | | | H02K 7/1823 |
| 2009/0180939 A1* | 7/2009 | Hagen | F23R 3/28 |
| | | | 422/600 |
| 2010/0095609 A1* | 4/2010 | Kim | F24S 25/10 |
| | | | 52/173.3 |
| 2010/0244450 A1* | 9/2010 | Tabe | F03B 13/262 |
| | | | 290/55 |
| 2010/0244451 A1* | 9/2010 | Ahdoot | F03B 13/186 |
| | | | 290/53 |
| 2010/0258449 A1* | 10/2010 | Fielder | F03B 17/061 |
| | | | 204/278 |
| 2012/0019003 A1* | 1/2012 | Hu | F03B 17/065 |
| | | | 290/53 |
| 2013/0140823 A1* | 6/2013 | Henry | F03D 9/007 |
| | | | 290/53 |
| 2014/0145442 A1* | 5/2014 | Hart | F03B 13/18 |
| | | | 290/53 |
| 2015/0089937 A1* | 4/2015 | Henry | F03D 9/008 |
| | | | 60/505 |
| 2015/0322914 A1* | 11/2015 | Zuo | F03B 13/186 |
| | | | 60/497 |
| 2017/0194837 A1* | 7/2017 | Sichau | H02S 10/10 |
| 2018/0030958 A1* | 2/2018 | Sant | F03D 9/28 |
| 2018/0128245 A1* | 5/2018 | Brown | F03D 9/007 |
| 2018/0238294 A1* | 8/2018 | Alm | F03B 13/20 |

FOREIGN PATENT DOCUMENTS

| | | | | |
|---|---|---|---|---|
| WO | WO-2016128962 A1 * | 8/2016 | | F03B 13/06 |
| WO | WO-2018216881 A1 * | 11/2018 | | F03B 13/18 |

* cited by examiner

OCEAN MULTITASKING GENERATOR

CROSS-REFERENCE TO RELATED APPLICATIONS

The instant application claims priority to Provisional Patent Application (PPA) 65/512,230 filed Jul. 6, 2023. All disclosure of the parent application is incorporated herein at least by reference.

BACKGROUND OF THE INVENTION

1. Field of the Invention

The present invention is in the technical field of electricity generation and pertains more particularly to methods and apparatus for generating electricity from wave motion, tides and wind simultaneously.

2. Description of Related Art

It is well known that electric generation by burning fossil fuels releases carbon into the Earth's atmosphere in gaseous forms. This circumstance, along with other situations releasing carbon into the atmosphere has resulted in demonstrable global warming, resulting in a number of detrimental phenomena in weather patterns and melting icecaps, raising sea level.

It is also well known that to reduce or eliminate global warming it is necessary to generate electricity from renewable sources like solar and wind energy, and both of these sources have been aggressively exploited. Another renewable source that has not been exploited to such an extent is energy from wave motion and tides. Apparatus is known that may be used in flowing water, such as a river or spill from a dam, and also in current induced by changes in tides. Some apparatus has been proposed as well that harnesses wave motion, such as U.S. Pat. No. 11,802,536 to the inventor of the present application.

What is needed in the art is an apparatus that may harness the changing motion of water in wave phenomenon, the movement of water in tidal changes, and harness wind as well in generating electricity with the same apparatus.

BRIEF SUMMARY OF THE INVENTION

In one embodiment of the invention an electricity generating apparatus is provided, comprising a base enclosure with a top surface and a passage into the enclosure having valves coupled to a source of water and of air under pressure, the valves controllable to alter the proportion of air and water in the base enclosure, determining buoyancy of the base enclosure, a first and a second hollow, watertight vertical tower, the towers spaced apart on the top surface of the base enclosure by a first width and extending upward to a first height above the top surface of the base enclosure, a turbine having a horizontal axis, a length and a circular shape of a diameter D orthogonal to the axis, with a plurality of curved panels proceeding from the axis, spaced around the axis, forming a plurality of bucket shapes facing substantially tangent to an outer edge of the circular shape, the turbine having a first shaft extending in a direction of the axis from a first end of the turbine and a second shaft extending in the direction of the axis from a second end of the turbine, a first generator in the first tower with a drive shaft coupled to the first shaft of the turbine passing through a watertight seal through a wall of the first tower such that rotary motion of the turbine turns the first generator, generating electricity, a conduit proceeding upward from an upper end of the first tower to an air pump powered by vanes driven by wind, the air pump providing air under pressure into the conduit, a horizontal manifold spanning between the two towers below the turbine with a manifold axis parallel to the axis of the turbine, the manifold provided with air under pressure from the conduit and having a plurality of upward facing air nozzles emitting air into water below the turbine, the manifold axis offset horizontally from the turbine axis by at least one quarter of diameter D and less than one half of diameter D, and offset vertically below the turbine axis by no more that diameter D, wherein the base enclosure has a buoyancy such that it floats with the first vertical tower projecting above a surface of the water with the air pump and wind driven vanes projected above the first tower, and with the turbine wholly immersed in the water, such that wave motion producing vertical currents and tidal action producing horizontal currents both drive the turbine that drives the generator, and the air pump provides air to the manifold providing air below the turbine that also drives the turbine.

In one embodiment the electricity generating apparatus further comprises control circuitry including wireless communication circuitry, a microprocessor and a data repository adapted to communicate wirelessly with a remote platform, whereby a user is enabled to command at least the valves determining buoyancy of the flotation tank. Also, in one embodiment the electricity generating apparatus further comprises at least one conductive cable proceed In one embodiment the electricity generating apparatus further comprises a second generator in the second tower with a drive shaft coupled to the second shaft of the turbine passing through a watertight seal through a wall of the second tower such that rotary motion of the turbine turns the second generator, generating electricity. And in one embodiment the apparatus further comprises a plurality of turbines implemented between the first and the second vertical tube enclosures, spaced apart vertically, each turbine driving a generator in each of the first and the second vertical tube enclosures.

In one embodiment of the invention the electricity generating apparatus further comprises a horizontal manifold spanning between the two towers below each one of the plurality of turbines with a manifold axis parallel to the axis of the proximate turbine, the manifolds each provided with air under pressure from the conduit and having a plurality of upward facing air nozzles emitting air into water below each of the turbines, the manifold axes offset horizontally from each of the turbine axes by at least one quarter of diameter D and less than one half of diameter D, and offset vertically below each turbine axis by no more that diameter D. Also, in one embodiment the electricity generating apparatus further comprises an anchor cable attached to the base enclosure at one end and to an anchor to a seafloor at an opposite end, the cable having sufficient length that the floating electrical generating apparatus establishes a substantial offshore position on an outgoing tide and a substantial inshore position on an incoming tide. Also, in one embodiment the base enclosure is a cylindrical enclosure with a vertical axis and a diameter greater than a distance across outside edges of the first and the second vertical towers. In one embodiment the base enclosure is in a shape of a donut with a vertical axis and an outside diameter greater than a distance across outside edges of the first and the second vertical towers. And in one embodiment of the electricity generating apparatus the base enclosure is in a shape of a cylinder with tapered ends having a substantially horizontal axis when floating, a cylinder diameter greater than a distance across outside edges of the first and the second vertical towers, and an upper structure on the cylinder of the base enclosure, providing a horizontal surface for the two vertical towers.

DETAILED DESCRIPTION OF THE INVENTION

Figure 1A:
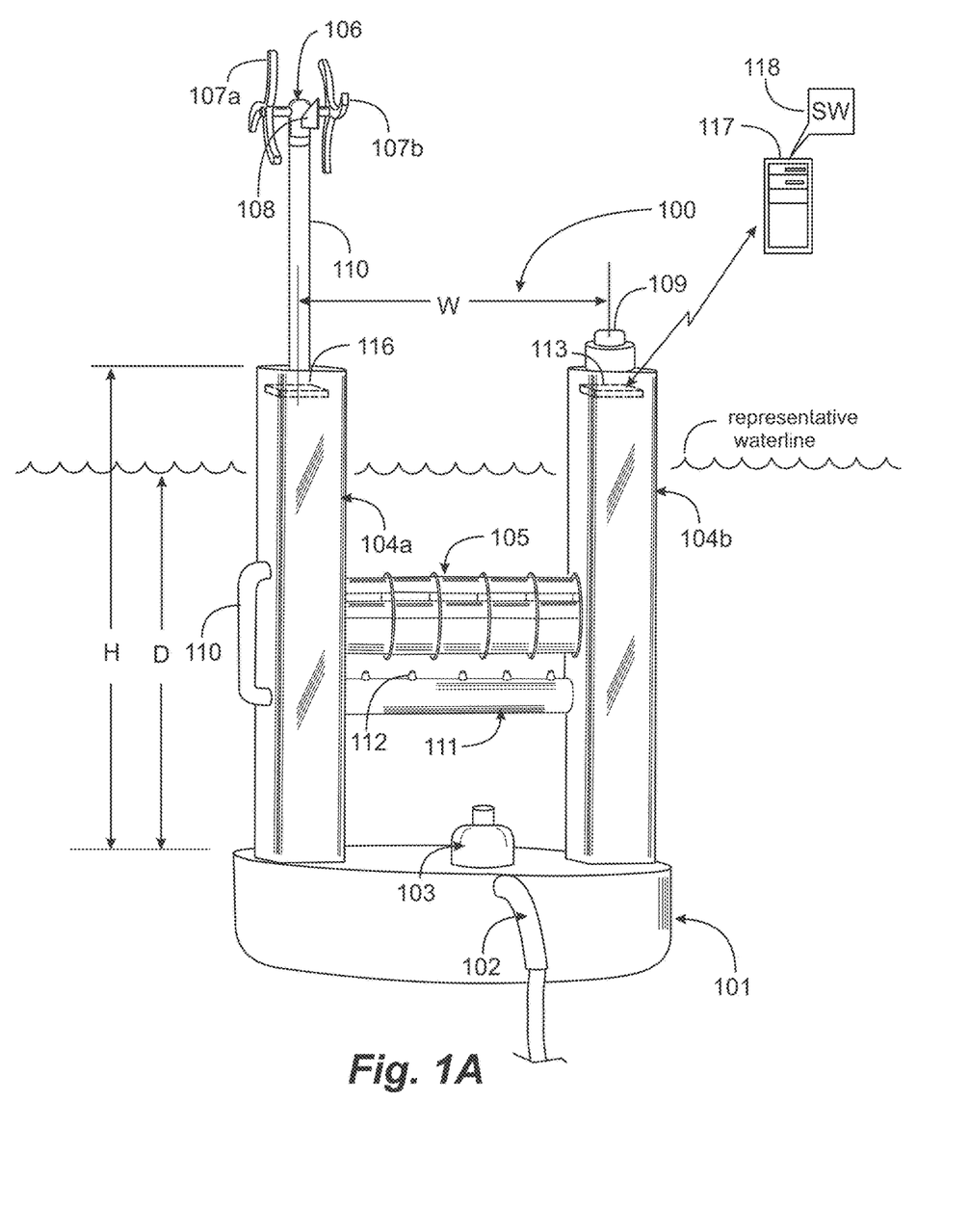
FIG. 1A is an elevation view of an apparatus in one embodiment of the present invention.

FIG. 1A is an elevation view of a generating apparatus 100 in one embodiment of the present invention. In this apparatus a flotation tank 101, in this example cylindrical with a substantially vertical axis, operates as a base for the apparatus. Flotation tank 101 may be partially filled with water to properly orient the apparatus vertically and has air in the tank as well. In some circumstances the flotation tank may also be weighted with metal, sand or stone. The proportion of air to water may be controlled to regulate a depth the apparatus will float and maintain. Valve 103 represents valves coupled to sources of air under pressure and water, which may be opened individually by remote command to admit or release air and to admit or release water, determining buoyancy of the flotation tank. Control circuitry 113 in this example in tower 104b is adapted to communicate wirelessly with a remote platform 117 executing in one embodiment software 118 to control various on-board elements. The remote platform in one embodiment may be a cellular telephone and SW 118 a mobile application. In another embodiment platform 117 is an on-shore computer platform and the SW provides input mechanisms for a user to command conduit 110 to raise and lower, to command valve 103 to alter the buoyancy of flotation tank 101. There are electrical connections not shown here between control circuitry 113 and electrically controlled elements.

Two watertight towers 104a and 104b extend upward from flotation tank 101 and are spaced apart a center distance W. A turbine 105 with a plurality of sections having curved panels providing buckets spans between the towers 104a and 104b and has a central shaft that enters each of the towers through a watertight seal. Turbine 105 is described in enabling detail below with reference to drawing figures. The shaft into each tower powers a mechanism, described further below, that drives one or more electricity generators. The mechanisms and the generators are not shown in FIG. 1A.

A conduit 110 extends upward from a top end of tower 104a and has an air pump 106 at an upper end of the conduit, the air pump driven by a set of vanes 107a and 107b. The height of the air pump above the tower may be changed and in one circumstance may be variable by a mechanism 114 in the tower that may be controlled remotely through control circuitry 113.

The air pump pumps air into conduit 110 which passes down through tower 104a in this example, bypasses the position of the turbine, and feeds air into a horizontal manifold 111 positioned just below and close to turbine 105. Manifold 111 has a series of nozzles 112 positioned one below each section of the turbine, that inject air that flows upward into the turbine buckets to help propel the turning of the turbine. A centerline of manifold 111 is offset from a centerline of the turbine to place the nozzles directly below the buckets of the turbine. This offset is described further below.

Tower 104b in this example has a rotatable mounting mechanism 109 at a top end enabling in one circumstance installation of another conduit topped with an air pump driven by vanes in wind. In one embodiment of the apparatus there may be two conduits with air pumps and vanes. Further, in the depiction of FIG. 1A a representative waterline is shown to show a depth for the apparatus in one circumstance.

Figure 1B:
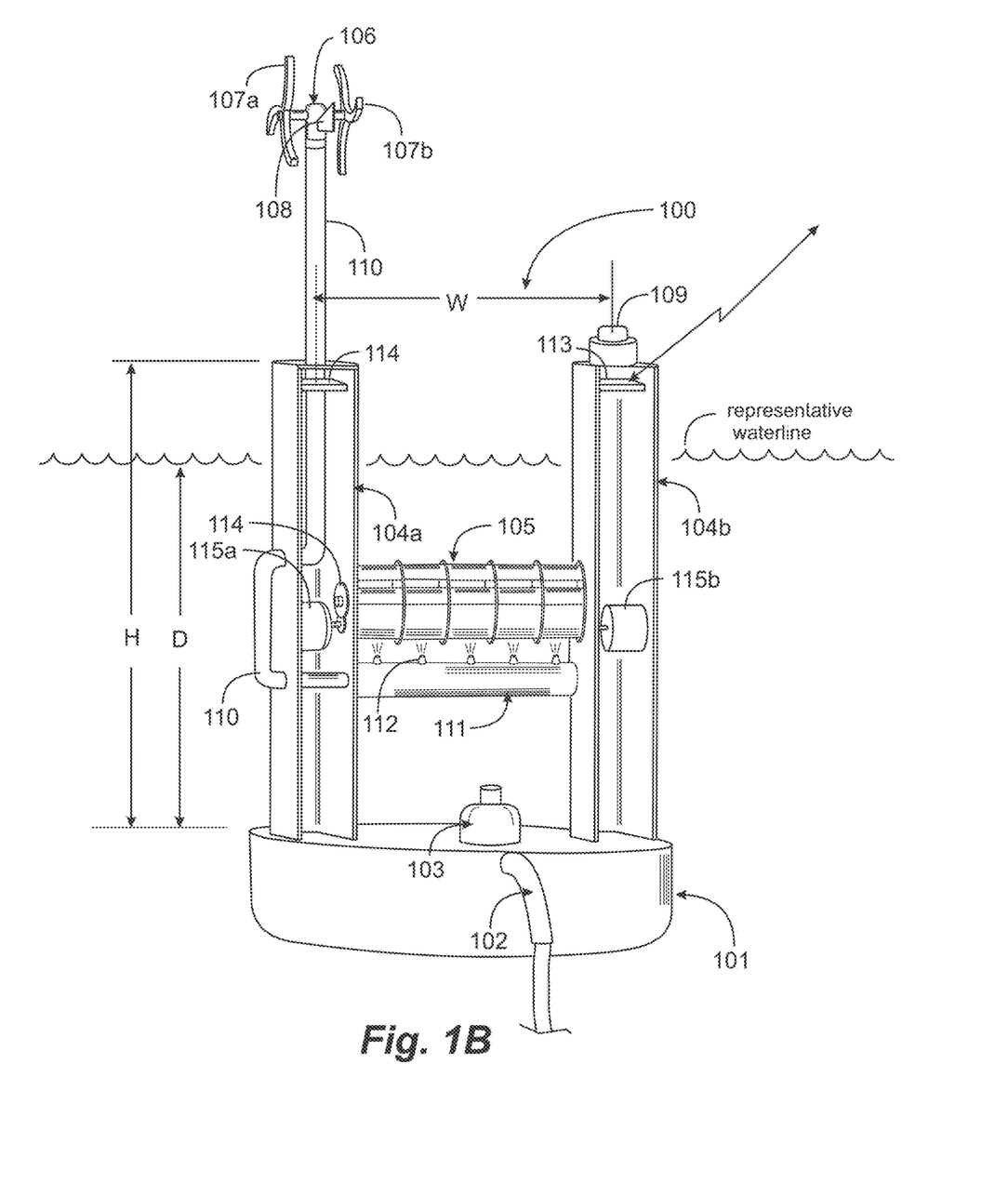
FIG. 1B is an elevation partial section view of the apparatus of FIG. 1A showing some internal elements.

FIG. 1B is an elevation partial section view of the apparatus of FIG. 1A showing some internal elements. It may be seen in FIG. 1B that turbine 105 in this example has a gear 114 inside tower 104a driven by a shaft from the turbine that is sealed through a wall of the tower. Gear 114 in this example drives a smaller gear on a shaft of a generator 115a. The generator is one of two or more driven by gearing through walls of the towers, and the generators feed electricity into an output cable 102. A skilled person will understand that there may be several turbines 105 stacked vertically between towers 104a and 104b, with associated manifolds 111 to provide torque by injected air, and the turbines are also driven by tidal current and wave action. There may also be a variety of ways the turbines may be engaged with the generators to drive the generators. That depicted is one example.

Figure 2A:
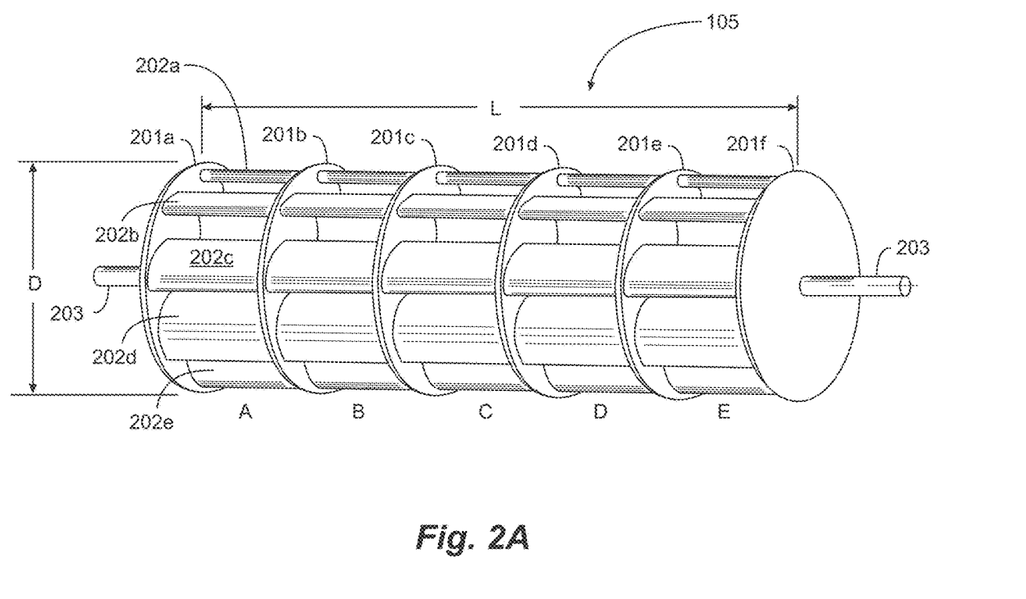
FIG. 2A is a perspective view of a turbine in an embodiment of the invention.

FIG. 2A is a perspective view of one turbine 105 in an embodiment of the invention. Turbine 105 in this example is made in five sections labeled A through E, with each section bounded by a rigid disc, shown as discs 201a through 201f, each having a common diameter D, and has an overall length L. Each section has a plurality of curved panels labeled 202a through 202e in this example, as three of the panels may not be seen in this perspective view. The panels are implemented between the discs and are equally spaced around the section and shaped to form buckets for capturing air and water flow in a manner to exert torque on the turbine, and hence on a shaft 203 that passes through a center axis of the turbine. A cross-section view FIG. 2B illustrates the shape and orientation of the curved panels in one section.

Figure 2B:
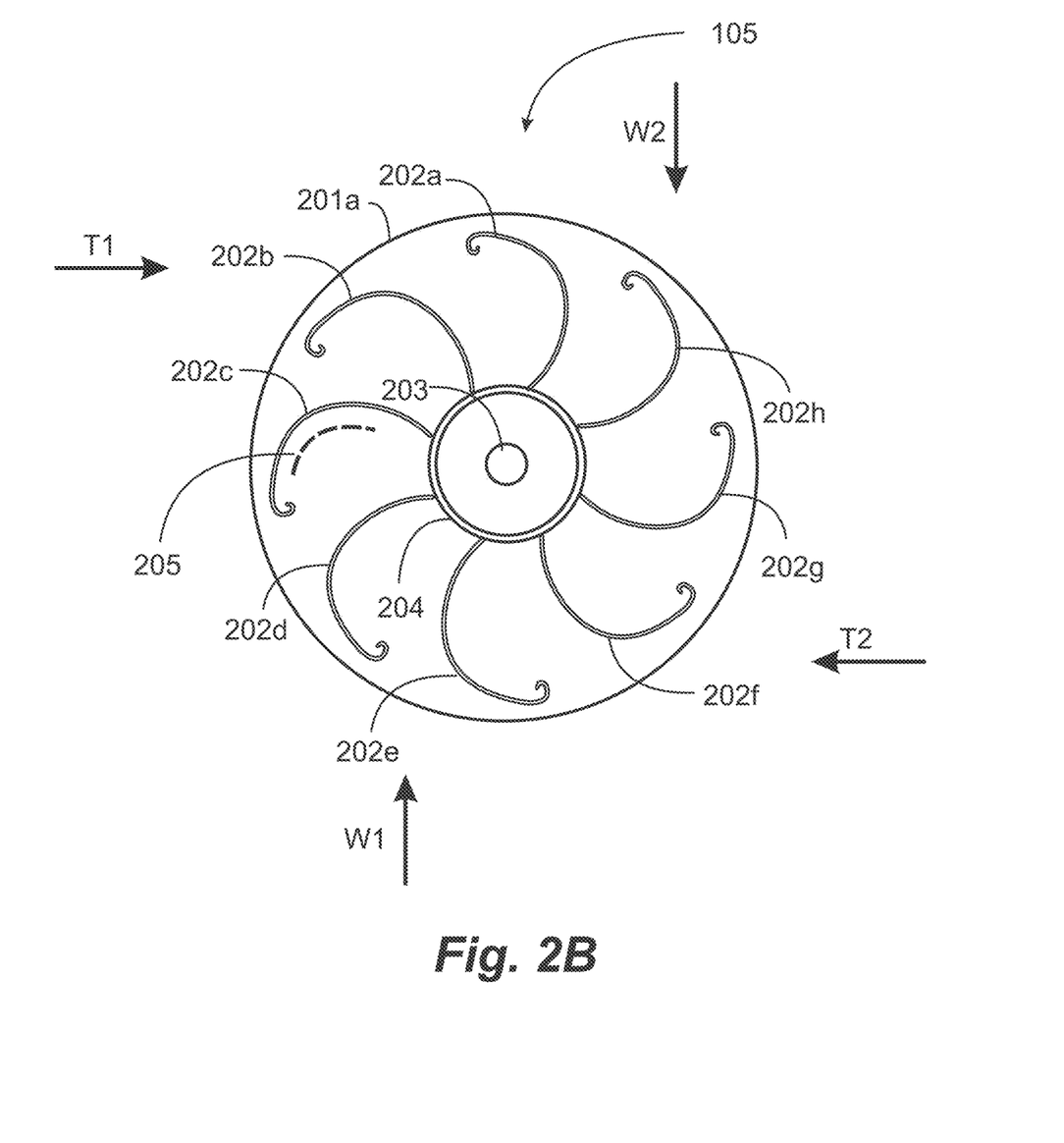
FIG. 2B is a section view through one section of the turbine in FIG. 2A.

FIG. 2B is a cross-section view through section A of the turbine taken at a right angle to shaft 203. This section view is common to sections B, C, D and E. Disc 201a is an end disc of the turbine, and eight curved plates 202a through 202h are implemented, by for example welding, between disc 202a and 202b (not shown) equally spaced around the circumference of the disc, as shown. A tubular member 204a is also implemented between discs 202a and 202b also by, for example, welding. Shaft 203 passes through the discs along the centerline axis and is welded to each disc. It will be apparent to the skilled person that water from tidal current, indicated by arrows T1 and T2 in opposite directions, will enter the space between panels into a shape termed by the inventor a bucket shape, denoted by element number 205 and impinge on the panels causing a torque to turn the turbine, in this view, clockwise.

Figure 2C:
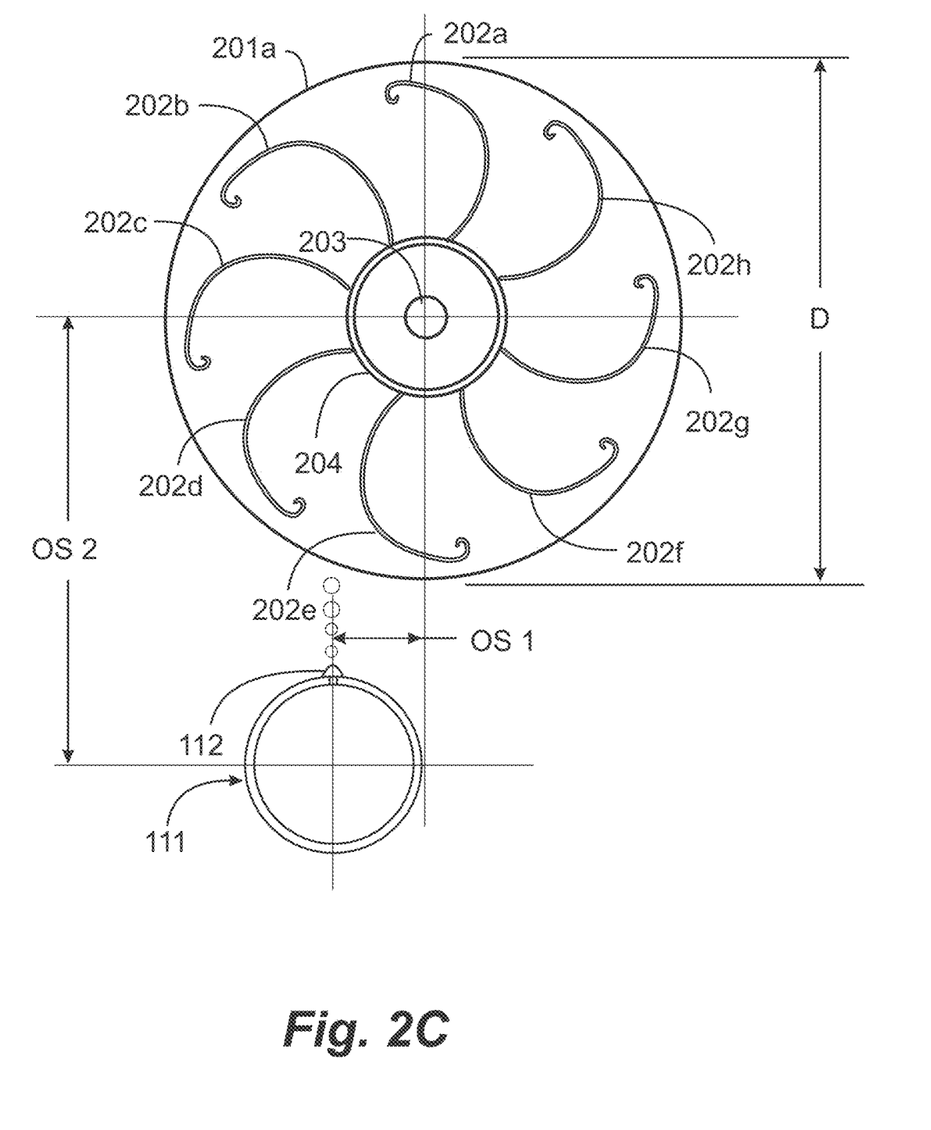
FIG. 2C is a section through the turbine and the air manifold of FIG. 1B orthogonal to an axis of the turbine.

FIG. 2C is a section taken through turbine 105 and air manifold 111 of FIG. 1B orthogonal to the axis of the turbine and the parallel axis of the air manifold. The centerline of manifold 111 is offset horizontally from the centerline of the turbine to a side that places the centerline of the manifold beneath openings into buckets of the turbine, such that air from nozzles 112 will rise into the buckets of the turbine. The horizontal offset is labeled OS 1 for offset 1. OS 1 is equal to or greater than one quarter of the diameter D of the discs of the turbine, and less than the radius of the discs of the turbine. The centerline of the air manifold is offset vertically below the centerline of the turbine by a distance labeled OS 2 for offset 2. OS 2 is preferably less than diameter D. In embodiments where there are multiple sets of turbines and manifolds each manifold is offset as shown.

Figure 3:
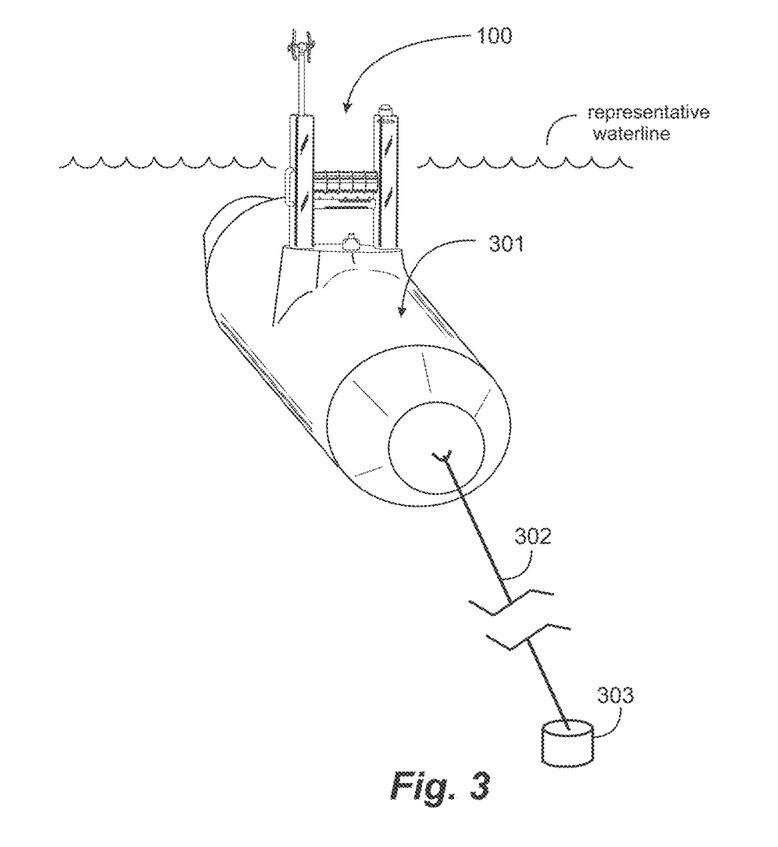
FIG. 3 is a perspective elevation view of a generating apparatus according to an embodiment of the invention on an alternative flotation tank.

FIG. 3 is a perspective elevation view of a generating apparatus 100 in another embodiment mounted on an alternative flotation tank 301. Generating apparatus 100 in this embodiment is essentially the same as described above, but flotation tank 301 in this version is a substantially cylindrical tank with tapered ends and the generating apparatus is mounted above the flotation tank with the towers at a right angle to an axis of the cylindrical shape of the flotation tank. Flotation tank 301 is anchored to the sea floor from one end as shown, by a cable 302 to an anchor 303 that may be a suction pile, or a plie driven into the sea floor. Cable 302 is shown in a broken view because the length of the cable is not to the scale of the drawing but may be very much longer than shown. The cylindrical shape of the floatation tank ensures that the flotation tank with the generating apparatus will swing from one side to the other as the tide changes. A conducting cable for electricity generated is not shown in FIG. 3 but may be assumed to be present, as is shown in FIG. 1. In different embodiments this cable, or a plurality of cables may lead, for example, onshore to connect to an electrical gris system.

A skilled artisan will understand that the embodiments illustrated in the accompanying figures and described in this specification are entirely exemplary and are not limiting to the scope of the invention, which is limited only by the claims.

The invention claimed is:

1. An electricity generating apparatus, comprising:
    a base enclosure with a top surface and a passage into the enclosure having valves coupled to a source of water and of air under pressure, the valves controllable to alter the proportion of air and water in the base enclosure, determining buoyancy of the base enclosure;
    a first and a second hollow, watertight vertical tower, the towers spaced apart on the top surface of the base enclosure by a first width and extending upward to a first height above the top surface of the base enclosure;
    a turbine having a horizontal axis, a length and a circular shape of a diameter D orthogonal to the axis, with a plurality of curved panels proceeding from the axis, spaced around the axis, forming a plurality of bucket shapes facing substantially tangent to an outer edge of the circular shape, the turbine having a first shaft extending in a direction of the axis from a first end of the turbine and a second shaft extending in the direction of the axis from a second end of the turbine;
    a first generator in the first tower with a drive shaft coupled to the first shaft of the turbine passing through a watertight seal through a wall of the first tower such that rotary motion of the turbine turns the first generator, generating electricity;
    a conduit proceeding upward from an upper end of the first tower to an air pump powered by vanes driven by wind, the air pump providing air under pressure into the conduit;
    a horizontal manifold spanning between the two towers below the turbine with a manifold axis parallel to the axis of the turbine, the manifold provided with air under pressure from the conduit and having a plurality of upward facing air nozzles emitting air into water below the turbine, the manifold axis offset horizontally from the turbine axis by at least one quarter of diameter D and less than one half of diameter D, and offset vertically below the turbine axis by no more that diameter D;
    wherein the base enclosure has a buoyancy such that it floats with the first vertical tower projecting above a surface of the water with the air pump and wind driven vanes projected above the first tower, and with the turbine wholly immersed in the water, such that wave motion producing vertical currents and tidal action producing horizontal currents both drive the turbine that drives the generator, and the air pump provides air to the manifold providing air below the turbine that also drives the turbine.

2. The electricity generating apparatus of claim 1 further comprising control circuitry including wireless communication circuitry, a microprocessor and a data repository adapted to communicate wirelessly with a remote platform, whereby a user is enabled to command at least the valves determining buoyancy of the flotation tank.

3. The electricity generating apparatus of claim 1 further comprising at least one conductive cable proceeding from the apparatus carrying electric current produced by the first generator.

4. The electricity generating apparatus of claim 1 further comprising a second generator in the second tower with a drive shaft coupled to the second shaft of the turbine passing through a watertight seal through a wall of the second tower such that rotary motion of the turbine turns the second generator, generating electricity.

5. The electricity generating apparatus of claim 1 further comprising a plurality of turbines implemented between the first and the second vertical tube enclosures, spaced apart vertically, each turbine driving a generator in each of the first and the second vertical tube enclosures.

6. The electricity generating apparatus of claim 5 further comprising a horizontal manifold spanning between the two towers below each one of the plurality of turbines with a manifold axis parallel to the axis of the proximate turbine, the manifolds each provided with air under pressure from the conduit and having a plurality of upward facing air nozzles emitting air into water below each of the turbines, the manifold axes offset horizontally from each of the turbine axes by at least one quarter of diameter D and less than one half of diameter D, and offset vertically below each turbine axis by no more that diameter D.

7. The electricity generating apparatus of claim 1 further comprising an anchor cable attached to the base enclosure at one end and to an anchor to a seafloor at an opposite end, the cable having sufficient length that the floating electrical generating apparatus establishes a substantial offshore position on an outgoing tide and a substantial inshore position on an incoming tide.

8. The electricity generating apparatus of claim 1 wherein the base enclosure is a cylindrical enclosure with a vertical axis and a diameter greater than a distance across outside edges of the first and the second vertical towers.

9. The electricity generating apparatus of claim 1 wherein the base enclosure is in a shape of a donut with a vertical axis and an outside diameter greater than a distance across outside edges of the first and the second vertical towers.

10. The electricity generating apparatus of claim 1 wherein the base enclosure is in a shape of a cylinder with tapered ends having a substantially horizontal axis when floating, a cylinder diameter greater than a distance across outside edges of the first and the second vertical towers, and an upper structure on the cylinder of the bsde enclosure, providing a horizontal surface for the two vertical towers.

* * * * *